United States Patent

Ibuchi

[15] 3,682,415

[45] Aug. 8, 1972

[54] TAPE CARTRIDGE

[72] Inventor: Kenji Ibuchi, Tokyo, Japan

[73] Assignee: Victor Company of Japan, Ltd., Yokohama, Kanagawa-ken, Japan

[22] Filed: June 10, 1970

[21] Appl. No.: 45,056

[30] Foreign Application Priority Data

June 10, 1969 Japan ........................44/45016
June 10, 1969 Japan ........................44/53762
Nov. 26, 1969 Japan ........................44/94242

[52] U.S. Cl. ..................................242/197, 274/11 B
[51] Int. Cl. .....G03b 1/04, G11b 15/32, G11b 23/04
[58] Field of Search ..............................242/197–200; 274/4 CE, 11 B, 11 C, 11 E

[56] References Cited

UNITED STATES PATENTS 3,006,650 10/1961 Ellmore.......................274/4 E

*Primary Examiner*—Leonard D. Christian
*Attorney*—Louis Bernat

[57] ABSTRACT

A tape cartridge contains a built-in magnetic tape supply reel having a hub and flanges enclosed within the cartridge casing. In the cartridge casing, there is provided a tape guide member which has a portion fitted between the flanges of the reel and an end portion extended toward a tape delivery opening of the casing.

7 Claims, 6 Drawing Figures

INVENTOR
KENJI IBUCHI
BY [signature]
ATTORNEY

INVENTOR

KENJI IBUCHI

BY [signature]

ATTORNEY

INVENTOR

KENJI IBUCHI

BY

ATTORNEY

INVENTOR

KENJI IBUCHI

BY

ATTORNEY

TAPE CARTRIDGE

This invention relates to magnetic tape cartridges each having a reel wound with a magnetic tape contained therein, and more particularly, to magnetic tape cartridges which are usable in a recording and reproducing apparatus of an automatic tape loading type.

An automatic tape loading type recording and reproducing apparatus has hitherto been proposed and disclosed in filed patent applications. In such apparatus, a magnetic tape is unwound from a reel in a tape cartridge and cause to run along a predetermined path of travel. Then the tape is automatically engaged and taken up by a take up reel. The apparatus of This kind cooperates with a tape cartridge containing a magnetic tape provided with a tape leader at its foremost leading. The leader is adapted end to cause the tape to travel along the predetermined path. The tape leader is usually made of a plastic or similar flexible material retaining its linearity normally in non-winding time. In particular, when the apparatus is one for recording and reproducing a video signal by means of rotary magnetic heads, it is necessary to wind the tape around a guide drum having rotary magnetic heads rotatably provided therein. This requires numerous non-linear and complicated travelling paths for the tape to follow. Therefore, the tape leader used in the automatic tape loading type recording and reproducing apparatus, as described, must be one which can be guided most smoothly and advanced along the complicated travelling path of tape.

Thus, the tape leader is required to have a linear directionality when unwound and sent out from the cartridge. With such linear characteristic, the leader often tends to unwind, find its way outside the cartridge, and become unwound from the reel on which it is supposed to be wound inside the cartridge. Also, sometimes the leader unwinds within the housing of the cartridge, escapes over the reel flange, and falls in a space between an inner wall of the cartridge casing and the reel flange. As a result, the leader and the tape cannot be delivered smoothly from the cartridge, but it is broken or damaged. If the magnetic surface of the tape is even slightly injured, a dropout is caused in a signal reproduced from the tape.

For making the delivery of the leader from the cartridge, a delivery roller fits from the outside into the inside of the cartridge casing and makes contact with an outer periphery of a roll or winding of the magnetic tape and the leader. By compressive rotation of the roller on the winding, the winding itself rotates together with the reel. The leader is thus sent out and delivered from the delivery opening of the cartridge casing. At this time, the leader tends to retain linearity. Therefore, with rotation of the winding, the forward end portion of the leader expands to the outside before it reaches the delivery outlet of the cartridge casing and falls into a space between the inner wall of casing and the reel flange, as hereinabove described. The same phenomenon may sometimes occur responsive to vibrations or oscillations of the cartridge during its carriage and moving. In this case, even though the leader does not fall in the space, the excessively expanded and loosened leader can not be sent out smoothly. Despite the rotating of the roller compressively contacting the winding, the winding and the leader are not rotated securely.

On the contrary, the leader which is forcibly wound up on the reel during a long interval will have a forward end tendency to wind on the reel in its winding direction. The end of the leader will not smoothly reach the outlet of the casing upon the feeding of the leader even though the winding of the leader and the tape is rotated. The leader therefore continues to rotate with the winding and will not be sent out satisfactorily smoothly.

It is a general object of the invention to provide a novel and useful tape cartridge which can remove all the disadvantages as described.

Another object of the invention is to provide a tape cartridge which permits smooth delivery of a leader at the forward end of a tape as it is sent out from the cartridge casing.

Still another object of the invention is to provide a tape cartridge which is so designed as to prevent a leader wound on a reel in the cartridge casing from falling in the space between the inner wall of the casing and the reel.

A further object of the invention is to provide a tape cartridge which permits smooth guidance of a leader toward a delivery outlet of the cartridge casing when the leader is delivered.

A still further object of the invention is to provide a tape cartridge which can prevent a leader and a tape wound on a reel from being unwound or loosened when the cartridge is not in use.

Further additional objects as well as additional features and advantages of the invention will become apparent from the description set forth hereafter when considered in conjunction with the accompanying drawings in which.

Figure 1:
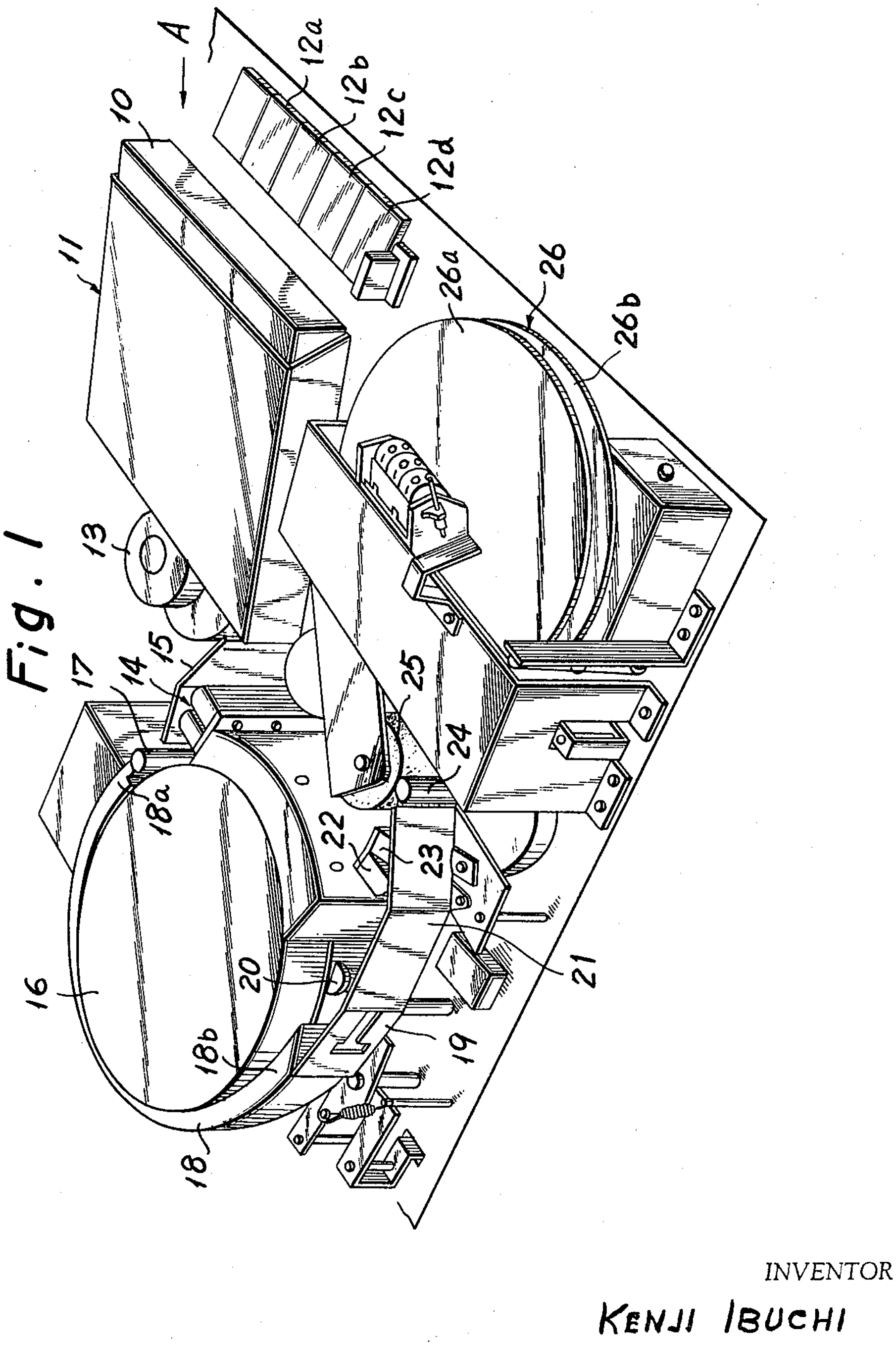
FIG. 1 is a perspective view of an embodiment of an automatic tape loading type recording and reproducing apparatus using a tape cartridge according to this invention.

With reference to FIG. 1, one embodiment of an automatic tape loading type magnetic recording and reproducing apparatus which cooperates with a tape cartridge according to the present invention will now be explained. In the apparatus a tape provided in the tape cartridge is automatically loaded at a predetermined path of travel in the apparatus, and a video signal is recorded on and reproduced from the tape. This apparatus is generally called a video cartridge recorder (VCR).

According to the invention, a tape cartridge 10 is inserted into the cartridge loading chassis 11 of the magnetic recording and reproducing apparatus in the direction of arrow A. The tape cartridge 10 has a reel built therein as described hereinafter. After the cartridge 10 is completely loaded in the chassis 11, a recording and reproducing button 12a is pushed. A delivery roller 13 is given a rotational force, and it begins to rotate. At the same time, the roller 13 enters into the tape cartridge 10 through an opening 30 (shown in FIG. 2) provided on the front end of the cartridge and is brought into contact with an outer periphery of a winding 32 wound on the reel 31 in the cartridge 10. The winding 32 includes a magnetic tape 33 and a relatively hard flexible tape leader 34 connected to the leading end of the magnetic tape.

As the roller 13 rotates, while it is in engagement with the winding, the leader 34 is delivered out of a delivery opening 35 of the cartridge and moves in a substantially straight direction. Then the tape leader is passed between a fixed erasing magnetic head assembly 14 and a guide plate 15, between a cylindrical guide drum 16 and a guide pole 17, and is moved into an entrance 18a of a tape leader guide 18.

The guide drum 16 includes an upper drum portion and a lower drum portion, and it has built-in rotary magnetic heads which are rotatable within a space interposed between the upper and lower portions of the drum. The leader guide 18 is mounted along substantially half the circumference of the guide drum 16 and is spaced apart therefrom by a small distance. The guide 18 is positioned obliquely with respect to the above-mentioned space between the upper and lower drum portions. The guide 18 has a C-shaped cross-section with its opening facing the guide drum 16.

The leader which has moved into the entrance *18a* is guided through the guide 18 to an exit *18b*, where it leaves the guide. Then, the tape leader passes between a guide plate 19 and a guide pole 20, and between a guide plate 21 and a magnetic head assembly including an audio signal magnetic head 22 and a control signal magnetic head 23. The leader further passes between a capstan 24 and a pinch roller 25, and it moves into a space between an upper flange *26a* and a lower flange *26b* of a rotating automatic take-up reel 26. The take-up reel 26 has pivotal pawls which are mounted on a hub of the reel in such a manner that they can emerge from and return to the hub and engage the tape leader as the reel rotates. Thus the tape is taken up and wound on the take-up reel 26. This concludes the operation of the automatically loading of the tape in the apparatus.

As the leader is engaged by the take-up 26, the roller 13 is moved away from the cartridge 10, and the pinch roller 25 contacts the capstan 24, thereby positively driving the tape leader and the tape. A first leader portion forming the foremost end of the tape leader has a width which is equal to the width of the tape, and it passes through within the leader guide 18. A second tape leader portion following the first leader portion has a width which is smaller than the width of the tape. As the second leader portion reaches the guide 18, following the movement of the first leader portion, the second leader portion is led out of the opening of the guide 18 whereby the magnetic tape following the second leader portion travels along a path which comes into engagement with the guide drum 16. Video signals are recorded on and reproduced from the tape by the rotary magnetic heads mounted on the guide drum 16, as the tape is moved by the capstan 24 and the pinch roller 25. Video signal tracks are disposed on the tape obliquely with respect to the longitudinal axis of the tape.

Figure 2:
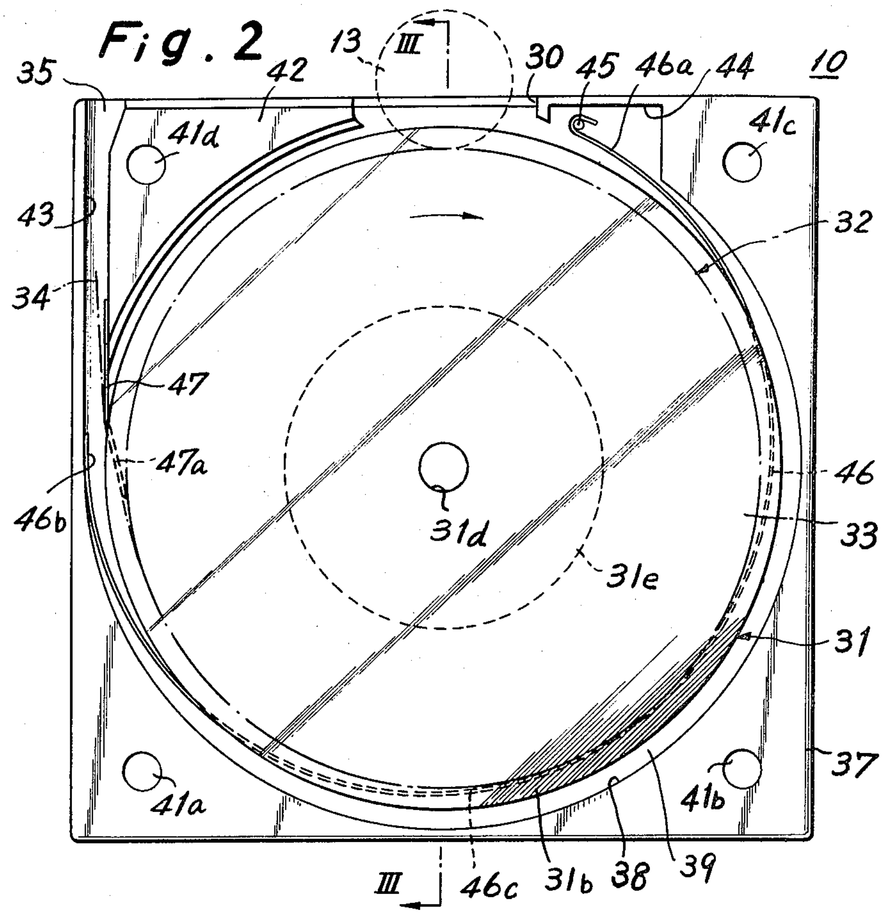
FIG. 2 is a plan view of a first embodiment of a tape cartridge according to the invention with its upper cover taken away.
Figure 3:
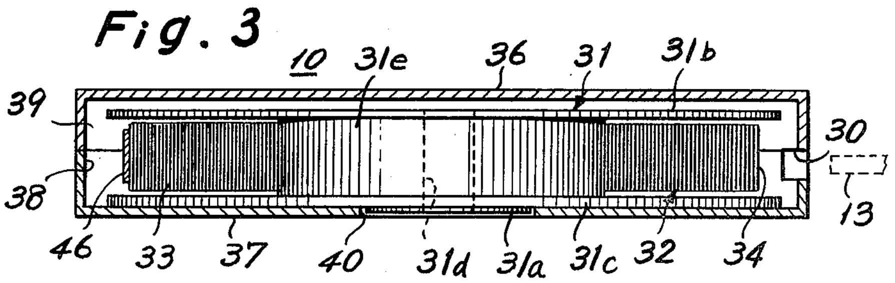
FIG. 3 is a vertical section taken along the line III—III of FIG. 2 with its upper cover attached.

Next, the tape cartridge 10 is described in detail, as a first embodiment of the invention, with reference to FIGS. 2 and 3. The cartridge 10 is formed in a casing having an upper cover 36 and a lower cover 37. The upper and lower covers 36 and 37 have a circular portion 38 similar in configuration to and larger in diameter than a reel 31. A space 39 is formed between the reel 31 and the circular portion 38. An opening 30, through which a roller 13 is fitted into the casing, is provided on the lower cover 37. An opening 40 is provided at the bottom of the lower cover 37. A projection 31a at the lower part of the reel 31 fits into the opening 40. The upper and lower covers 36 and 37 are fastened with screws and nuts which pass through apertures *41a*, *41b*, *41c* and *41d*. The reel 31 consists of upper and lower reel flanges *31b* and *31c* and a reel hub 31e having a reel hole *31d*.

The circular portion 38 extends in continuity toward the delivery opening 35. A passageway 43, through which the leader and tape pass, is formed between the extended portion and a block 42. An upstanding pin 45 is positioned in a recessed portion 44 adjacent the opening 30. A guide member 46 is a circular shape and positioned substantially along the circular portion 38. The guide member 46 has an end portion *46a* which engages the pin 45. The other end portion *46b* makes contact adjacent to and extending the passageway 43 to the circular portion 38. A middle portion *46c* of the guide member 46 fits into between the upper and lower flanges *31b* and *31c* of the reel 31. The portion *46c* contacts the outer periphery of the winding 32 when the tape 33 and the leader 34 are completely wound upon the reel. The guide member 46 is made for instance of acrylic resin material. The guide member 46 is smaller in width than the vertical space between the upper and lower reel flanges 31 *b* and *31c*.

A guide plate 47 is secured to the block 42 with one end located in the passageway 43 and the other end *47a* resting on the tape. The guide plate 47 is made of relatively flexible polyethylene telephthalate resin. The guide plate 47 has a portion which is slightly bent at the middle thereof so that the end *47a* makes contact with the outer periphery of the winding 32, with a proper compressive force.

In the tape cartridge 10 of the above described structure, the delivery roller 13 as mentioned above is inserted through the opening 30 and into the cartridge 10 before the leader is unwound. The roller 13 fits into between the upper and lower flanges *31b* and *31c* of the reel 31 and contacts the periphery of the outer tape winding 32. As the roller 13 rotates, the winding 32 rotates clockwise (as viewed in FIG. 2) together with the reel 31. By a rotation of the winding 32, the forward end of the leader 34 is guided by the guide member 46 to advance toward the end portion *46b*. The end portion *46b* of the guide member 46 smoothly blends the circular path 32 into the straight path at one side of the passageway 43. Since the leader 34 has an inherent characteristic to retain linearity, the forward end of the leader 34 will extend outwardly from the outer periphery of the winding 32. Thus the leader is guided by the inside surface of the guide member 46 until it reaches the passageway 43. With further rotation of the winding 32, the leader 34 passes through the passageway 43 and is sent out from the cartridge 10 through the delivery opening 35. As explained with reference to FIG. 1, the leader 34 is guided along a predetermined path of travel in the recording and reproducing apparatus.

Thus the leader 34 is normally controlled by the guide member 46 and prevented from loosening outwardly from the winding to fall in the space 39 between the reel 31 and the circular portion 38. As a result, the leader 34 is smoothly guided toward the delivery opening 35 during its delivery.

When the leader 34 is compressed by the guide member 46 is wound up for a long period of time within the area represented by the dot-dashed line 32, the leader 34 comes to have a characteristic which makes it curve in the direction of the winding 32. Reversely, the inwardly curved leader 34 tends to follow the circular portion 38 with the winding 32 without entering into the passageway 43. As the forward end **47*a* of the guide plate 47 comes into contact with the outer periphery of the winding 32, the forward end of the leader 34 is guided by the outer surface of the guide plate 47 to reach the passageway 43 and is securely fed to the delivery opening 35**.

Figure 4:
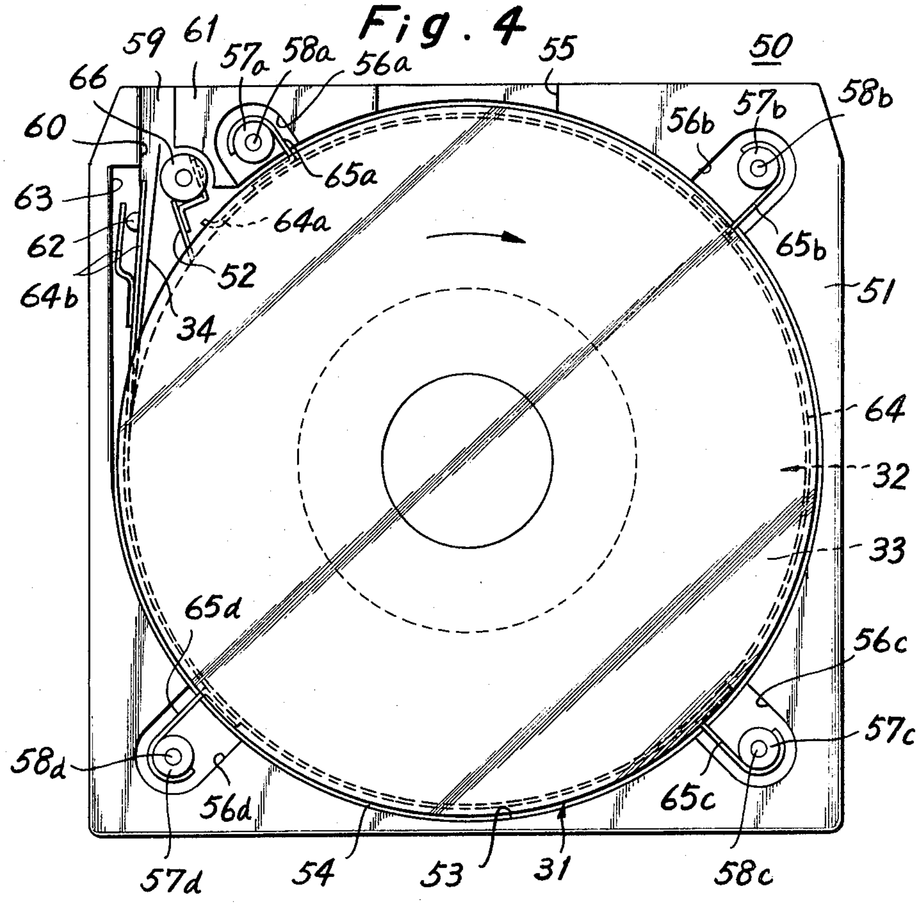
FIG. 4 is a plan view of a second embodiment of a tape cartridge according to the invention with its upper cover taken away.

A second embodiment of the tape cartridge, according to the invention, is now described with reference to FIG. 4. A tape cartridge 50 of this embodiment is formed in a casing by an upper cover and a lower cover 51 similar to the tape cartridge 10 shown in the above embodiment. In FIG. 4, the embodiment is shown with the upper cover taken away. On the upper cover and the lower cover 51, there is provided a circular portion 53 of a diameter which is larger than that of the reel 31. A space 54 is formed between the reel 31 and the circular portion 53. An opening 55, through which the delivery roller 13 is fitted, is provided in the lower cover 51. Studs **57*a* to 57*d* are provided in recesses 56*a* to 56*d* in the four corners of the lower cover 51. The upper cover and the lower cover 51 are fastened to each other with screws and nuts passing through holes 58*a* to 58*d* and penetrating through the studs 57*a* to 57*d***.

The circular portion 53 extends in continuity toward a delivery opening 59. The extended portion forms a passageway 60 with a block 61. Between the passageway 60 and the circular portion 53 is provided a recess 63 having a projection 62 located therein. A circular guide member 64, made of acrylic resin, has portions **65*a* to 65*d* secured at four places for engaging the studs 57*a* to 57*d*. One end 64*a*, of the guide member 64, is located adjacent the inlet of the passageway 60, and the other end 64*b* is divided into a fork. The other end 64*b* holds a projection 62 by the fork and is in engagement therewith. The inside of the end 64*b* extends nearly continuously along the inner surface of the passageway 60. A part, other than the end 64*b*, is fitted into between the upper and lower flanges of the reel 31 to make contact with or be slightly spaced from the outer periphery of the winding 32 of the tape 33 and the leader 34 wound on the reel 31**.

A post 66 is provided at the inlet of the passageway 60 in the vicinity of the block 61. A guide plate 52 is fixed to the post 66 with its forward end in contact with or slightly spaced from the outer periphery of the winding 32. A recess (not shown) is provided at a position opposite to the opening 55 on the guide member 64, in a position such that it will enable an entrance of the roller 13 therein.

Upon the unwinding of the leader, the roller 13 fits into the cartridge 50 through the opening 55 and compresses the outer periphery of the winding 32. As the roller 13 rotates, the winding 32 rotates clockwise together with the reel 31. By rotation of the winding 32, the leader 34 is led by the circular inside surface of the guide member 64 to the inner surface of the other end **64*b*. Then the leader 34 is prevented from falling in the space 54. At this instant, the leader 34, by inherent linearity, moves to the passageway 60 along the inner surface of the other end 64*b*, reaches the delivery opening 59**, and leaves therefrom.

While the leader 34 might tend to enter into the guide member 64, along with the winding 32 without entering into the passageway 60, it is not possible since the leader 34 is guided by the guide plate 52, and thereby forced to reach the passageway 60, from which it is sent out through the opening 59.

Figures 5, 6:
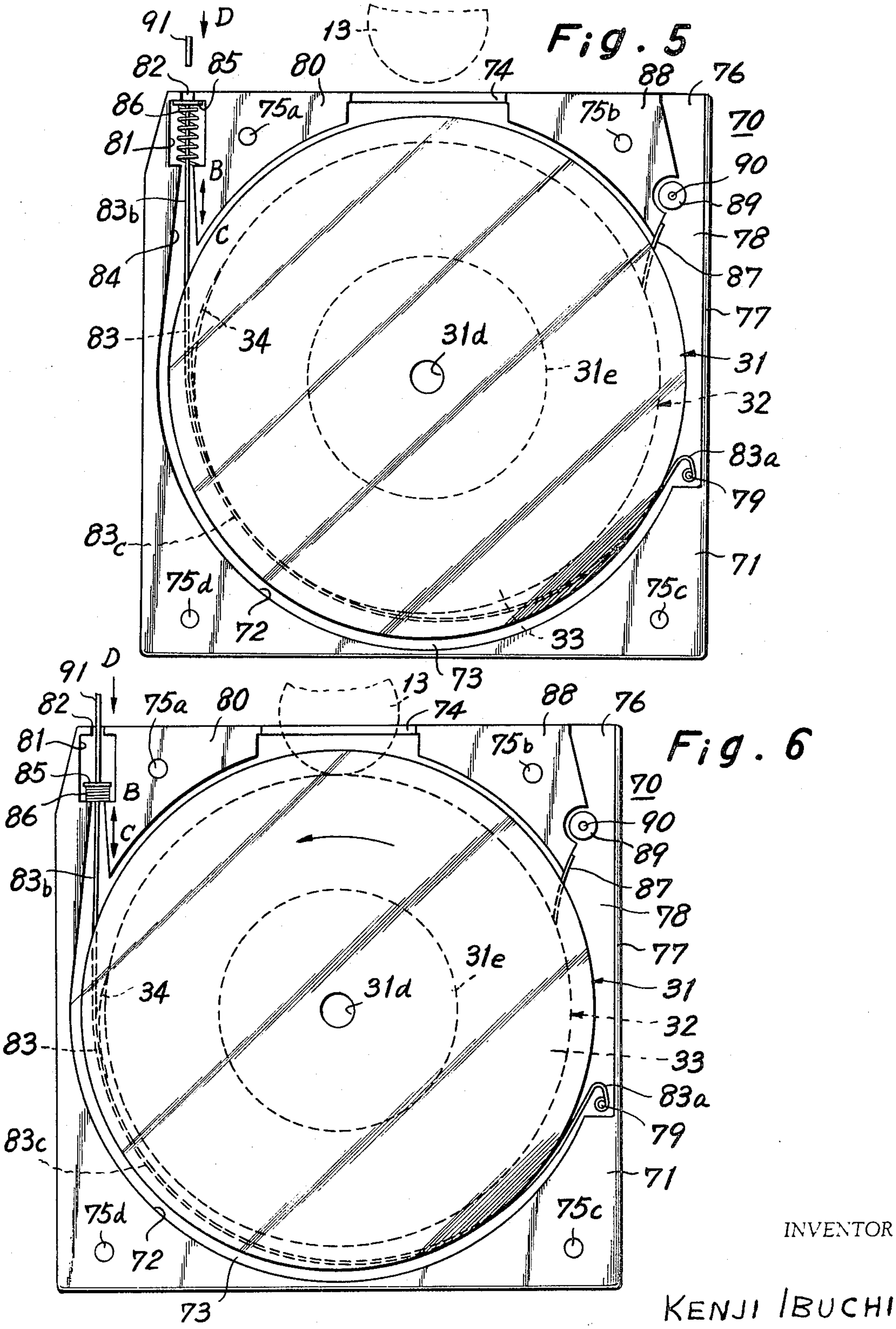
FIG. 5 is a plan view of a third embodiment of a tape cartridge according to the invention with its cover taken away in a state before it is loaded in the apparatus.
FIG. 6 is a plan view of the tape cartridge of FIG. 5 in a state after it is loaded in the apparatus.

A third embodiment of the tape cartridge of the invention is now described with reference to FIGS. 5 and 6. In a tape cartridge 70 of this embodiment, an upper cover and a lower cover 71 form a casing as in the tape cartridge 10 of the first embodiment. FIGS. 5 and 6 show the tape cartridge with the upper cover taken away. On the upper cover and the lower cover 71, there is provided a circular portion 72 of a diameter which is larger than that of the reel 31. A space 73 is formed between the reel 31 and the circular portion 72. The lower cover 71 is provided with an opening 74 through which the roller 13 is fitted. The upper cover and the lower cover 71 are fastened to each other with screws and nuts passing through holes **75*a* to 75*d***.

A delivery opening 76 is shown on the upper right side on the figure. A passageway 78 is formed along a side wall 77 on the right side of the cartridge. Adjacent the connecting part of the circular portion 72 and an inside of the side wall 77, there is an upstanding pin 79. A recess 81 is formed on a block 80 on the left side of the lower cover 71. At the front part of the block 80 is provided a control hole 82 to receive a pin. A circular guide member 83, made of flexible acrylic resin material, has an end **83*a* in engagement with pin 79. The other end 83*b* of the guide member 83 passes through a groove 84 so as to locate the forward end of an engaging plate 85 in the recess 81. A spring 86 is compressed between the engaging plate 85 and an end of the recess 81. A guide member 83 is always biased by a spring 86 in the arrow direction B. A middle portion 83*c* of the guide member 83 is always by the spring 36 and fitted between the upper and lower flanges of the reel 31. Then, the middle portion 83*c* compressively makes contact with the outer periphery of the winding 32 of the tape 33 and leader 34, as shown in FIGS. 5**.

A guide plate 87 is secured to a block 88 and has a free end in the passageway 78. The other end of the guide plate 87 makes contact with the outer periphery of the winding 32. A guide roller 89 is rotatably provided on a shaft 90.

Before the tape cartridge 70, of the described construction, is loaded in the chassis 11 of the apparatus, the guide member 83 is pulled by the bias of spring 86, as shown in FIG. 5. Accordingly, the middle portion 83*c* of the guide member 83 is intensely compresses against the outer periphery of the winding 32. The winding 32 and the reel 31 will not rotate and consequently the winding 32 will not unwind.

Then the tape cartridge 70 may be loaded in the cartridge loading chassis 11 of the apparatus. By insertion of the cartridge 70, a fixed control pin 91 in the apparatus is pushed through the hole 82 and into the recess 81 in the direction of the arrow D. As the control pin 91 enters the recess 81, the engaging late 85 is pushed by the forward end of the pin 91 and moved in the direction of the arrow C against the resisting force of the spring 86. Through movement of the engaging plate 85, the other end 83*b* of the guide member 83 is moved in the direction of the arrow C. Therefore, the middle portion 83*c* of the guide member 83 is detached moved away from the outer periphery of the winding 32. When the cartridge 70 is completely loaded in the housing, the engaging plate 85 and the end 83*b* are displaced to an extreme position by the control pin 91 as shown in FIG. 6. By displacement of the end 83*b*, the middle portion 83*c* of the guide member 83 (in engagement with the end 83*a* ) is moved to the extreme from the outer periphery of the winding 32 as shown in FIG. 6. In this position, the middle portion 83*c* still fits between the upper and lower flanges of the reel 31.

In this state, the roller 13 enters the cartridge through the opening 74, and makes contact with the outer periphery of the winding 32. By rotation of the roller 13, the winding 32 is rotated counterclockwise (as viewed the figure) together with the reel 31. And, by rotation of the winding 32, the forward end of the leader 34 is continuously guided along the inner periphery of the guide member 83. Thereafter the leader 34 reaches the passageway 78 and moves along the inside of the side wall 77. The leader 34 moves in the passageway 78 and is thus delivered and sent out from the cartridge 70 through the opening 76.

The functions and objects of the guide plate 87 are the same as those of the guide plates 47 and 52 in the above first and second embodiments. Its description is therefore omitted.

According to the cartridge 70 of the present embodiment, the winding 32 and the reel 31 will not rotate uselessly because the guide member 83 compresses and brakes the outer periphery of the winding 32 when the cartridge is not in use. The winding 32 then will not unwind. During use of the cartridge the guide member 83 is moved away from the winding 32 and guides both the leader and the tape, not to fall in the space 73.

After the tape 33 has accomplished the recording, reproducing and rewinding, the cartridge 70 may be unloaded from the chassis 11 of the apparatus. The control pin 91 is then taken out of the recess 81. In consequence, the guide member 83 is tensioned by force of the spring 86 to assume a position as shown in FIG. 5. Then the middle portion 83*c* compresses and acts as a brake upon the outer periphery of the winding 32.

In case the tape cartridges 10 and 50, as described in the above first and second embodiments, are employed in the recording and reproducing apparatus of FIG. 1, the magnetic tape 33 is wound with its magnetic surface turned to the outside of the winding 32. In the tape cartridge 70 of the third embodiment the magnetic tape 33 is wound with its magnetic surface turned to the inside of the winding 32.

In the above embodiments, the magnetic tape and the leader are wound on the reel. However the winding may also comprise a film or the like. In this specification and the appended claims, the tape should mean a tapelike member such as a magnetic tape, leader, film etc.

What I claim is:

1. A tape cartridge comprising a reel having a hub and at least one flange, a tape wound on the hub and adjacent the flange, a casing for containing the reel, a tape guide member having two ends and being contained in said casing, said tape guide member having a substantially circular guiding portion extending between said two ends, said substantially circular guiding portion being fitted around the tape, one end of said tape guide member being fixed to the casing, and a delivery opening in said casing from which the tape is delivered, the inner peripheral guide surface of said guide member having an end connected to a side of a passageway directed substantially to said delivery opening.

2. The tape cartridge of claim 1 in which said reel has two spaced parallel flanges, said substantially circular guide portion of the guide member having a guide surface with a portion fitted inwardly of said reel and between said flanges and making contact with the outer periphery of said tape wound on said reel.

3. The tape cartridge of claim 1 in which said reel has two spaced parallel flanges, said substantially circular guide portion of the guide member having a guide surface with a portion fitted inwardly of said reel and between said flanges and spaced slightly away from the outer periphery of said tape winding.

4. The tape cartridge of claim 1 in which said one end of said tape guide member is fixed in said casing at a point which is spaced outwardly away from the outer periphery of said reel flange.

5. The tape cartridge of claim 1 and further means comprising a guide plate directed toward the outer periphery of the windings of said tape from the other side of the passageway to direct said tape to said delivery outlet.

6. A tape cartridge comprising a reel having a hub and at least one flange, a tape wound on the hub and adjacent the flange, a casing for containing the reel, a tape guide member in the casing, said guide member having a portion which is fitted to a side of the casing and another portion which is substantially a circular guide surface fitted around the tape, a delivery opening in said casing from which the tape is delivered, the inner peripheral guide surface of said guide member having an end connected to a side of a passageway directed substantially to said delivery opening, means for forcing said tape guide member against said tape to compress said guide surface against the outer periphery of the tape winding, and means responsive to the insertion of said cartridge into a chassis at a predetermined position in a tape recording and reproducing apparatus for releasing said compression of said tape.

7. A tape cartridge comprising a reel having a hub and at least one flange, a tape wound on the hub and adjacent the flange, a casing for containing the reel, a tape guide member having a substantially circular guiding portion except at both ends, means comprising a plurality of engaging parts fixed in said casing at the outer periphery of said guiding portion for positioning said substantially circular guide portion of the guide member around the tape, and a delivery opening in said casing from which the tape is delivered, the inner peripheral guide surface of said guide member having an end connected to a side of a passageway directed substantially to said delivery opening.

* * * * *